3,455,918
ALPHA, ALPHA, ALPHA - TRIHALOGENO - BETA,
BETA - BIS(PARA - TERTIARY-AMINOALKOXY-
PHENYL)-ETHANES
Adrian Marxer, Muttenz, and Pier Giorgio Ferrini, Basel,
 Switzerland, assignors to Ciba Corporation, New York,
 N.Y., a corporation of Delaware
No Drawing. Filed Dec. 16, 1965, Ser. No. 514,361
Claims priority, application Switzerland, Jan. 4, 1965,
 58/65; Oct. 11, 1965, 13,991/65; Nov. 30, 1965,
 16,490/65
Int. Cl. C07c *93/08;* C07d *87/40;* A61k *27/00*
U.S. Cl. 260—246                                9 Claims

ABSTRACT OF THE DISCLOSURE

α,α,α - Trihalogeno-β,β-bis-(para-tertiary aminoalkoxy-phenyl)-ethanes of the formula

in which $R_5$ represents a trihalogenmethyl radical, the symbols Ph represent para-phenylene radicals, and R and R' tertiary aminoalkyl radicals, and their salts, useful for treating arteriosclerosis, atherosclerosis; the compounds are also amoebicidal and trypanocidal.

---

The present invention relates to new basic ethers. Especially it concerns α,α,α-trihalogeno-β,β-bis-(paratertiary aminoalkoxy-phenyl)-ethanes of the formula

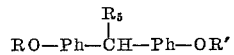

in which $R_5$ represents a trihalogenmethyl radical, the symbols Ph represent para-phenylene radicals, and R and R' tertiary aminoalkyl radicals, and their salts.

In the new compounds the phenylene residues Ph are either unsubstituted or they may carry substituents, such as lower alkoxy or lower alkyl radicals or above all halogen atoms. These substituents are advantageously in the ortho-position relatively to the tertiary aminoalkoxy group.

The alkylene residues which in the tertiary amino-alkoxy groups RO or R'O link the tertiary amino groups with the oxygen atoms are preferably straight or branched lower alkylene residues containing 2 to 5 carbon atoms, such as ethylene groups or linear or branched propylene, butylene or pentylene groups.

The halogen atoms at the ethylene residue which links the two phenyl residues are fluorine or preferably bromine atoms or in the first place chlorine atoms.

Suitable substituents for the tertiary amino group are above all lower hydrocarbon residues, which may be interrupted by heteroatoms such as oxygen, sulphur or nitrogen and, if desired, linked with the alkylene residue. Suitable lower hydrocarbon residues are above all: Lower alkyl or alkenyl residues such as methyl, ethyl, propyl or isopropyl; linear or branched butyl or pentyl residues which may be linked in any desired position, allyl, methallyl; alkylene radicals, for example butylene(1,4), pentylene(1,5), 1,5-dimethyl-pentylene(1,5), hexylene(1, 6) or hexylene(1,5), or oxaalkylene, azaalkylene or thiaalkylene radicals, such as 3-oxapentylene-(1,5), 3-aza-pentylene-(1,5), 3-thiapentylene-(1,5), 3-aza-hexylene(1, 6), 1,5-dimethyl-3-aza-pentylene(1,5), 3-methyl-3-aza-pentylene(1,5) or 3-hydroxyethyl-3-aza-pentylene(1,5) residues. Tertiary aminoalkoxy residues in which one substituent of the tertiary amino group is linked with the alkylene radical which connects the amino group with the hydroxyl group, are for instance N-alkyl-pyrrolidinyl-2- or -3-alkoxy radicals or N-alkyl-piperidyl-2- or -3-alkoxy residues.

The tertiary amino group is above all a di-lower alkylamino group such as the dimethylamino, diethylamino, dipropylamino, N-methyl-N-ethylamino group, a pyrrolidino, piperidino, morpholino or thiamorpholino group, such as the pyrrolidino, piperidino, morpholino, piperazino or N-methyl-piperazino group.

The new compounds possess valuable pharmacological properties. Inter alia, they effect the cholesterol level. For example in animal tests on rats they affect the blood cholesterol level and are, accordingly, suitable for treating arteriosclerosis, atherosclerosis and similar diseases. Furthermore, they develop an anti-parasite action. For example, they have an amoebicidal action as shown by animal experiments, e.g. on hamsters and rats, and a trypanocidal action, e.g. in the mouse. They can therefore be used as amoebicidal and trypanocidal agents. They are also suitable for use as intermediates in the manufacture of medicaments.

Especially valuable are the compounds of the formula

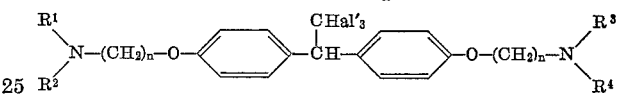

where $n=2$ or 3; Hal' is chlorine or bromine and $R^1$ to $R^4$ each is a lower alkyl radical, or $R^1+R^2$ and $R^3+R^4$ together with the nitrogen atom form an alkylene-imino ring which may be interrupted by hetero atoms as described above. A particularly favourable effect is achieved with α,α,α - trichloro-β,β-bis-[p-(β-diethylaminoethoxy)-phenyl]-ethane which, for example, in the form of its dihydrochloride has a marked amoebicidal action on oral administration of 10–60 mg./kg. doses to hamsters and rats, and a marked trypanocidal action on oral administration to the mouse of 100 mg./kg. doses.

The new compounds are manufactured in the known manner. Advantageously, a compound of the formula

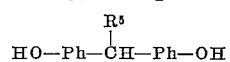

where $R^5$ and Ph have the meanings given, preferably in the form of a metal salt thereof, e.g. an alkali metal salt, or in the presence of a condensing agent capable of forming such salts is reacted with a tertiary aminoalkyl halide, e.g. the chloride, bromide or iodide.

The above-mentioned reactions are performed in the known manner, in the presence or absence of diluents and/or condensing agents, at room temperature or with cooling or heating, under atmospheric or superatmospheric pressure.

Depending on the reaction conditions used the new compounds are obtained in the form of the free bases or of their salts. The latter are also within the scope of this invention. The salts of the end products can be converted into the free bases in per se conventional manner, for example with alkalis or ion exchange resins. From the free bases, salts can be obtained by reaction with organic or inorganic acids, especially those suitable for the formation of therapeutically acceptable salts. Such acids are, for example, hydrohalic acids, sulfuric acids, phosphoric acids, nitric acid, thiocyanic, acetic, propionic, oxalic, malonic, tartaric, succinic, malic, methanesulphonic, ethanesulphonic, hydroxyethanesulphonic, benzenesulphonic or toluenesulphonic acid, or of other therapeutically useful acids.

These and other salts of the new compounds, as for example the picrates, can also be used for purifying the resulting free bases by converting the free bases into salts, isolating the salts, and liberating the free bases from the salts. In view of the close relation between the free bases and a base in the form of a salt thereof, whenever a free base is referred to in this context, a corresponding salt is also intended, provided such is possible or applicable under the circumstances.

The starting materials are known or can be prepared by known methods.

The invention includes also any modification of the present process in which an intermediate obtained at any stage of the process is used as starting material and any remaining step/steps is/are carried out, or in which the starting materials are formed under the reaction conditions. Thus, for example, the starting material may be a suitable α,α,α-trihalogeno-β-(para-tertiary aminoalkoxy-

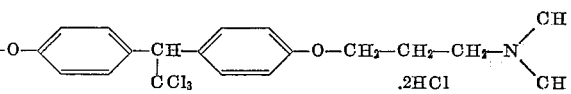

phenyl)-β-(para-hydroxyphenyl)-ethane which is reacted, for example as described above, with a tertiary aminoalkyl halide. In this manner it is possible, for example, to arrive at compounds in which the two tertiary amino groups are not identical.

The new compounds may be used as medicaments, for example in the form of pharmaceutical preparations containing them in the free form or in the form of a salt thereof in conjunction or admixture with an organic or inorganic, solid or liquid pharmaceutical excipient suitable for enteral or parenteral administration. Suitable excipients are substances that do not react with the new compounds, for example water, gelatine, lactose, starches, magnesium stearate, talcum, vegetable oils, benzyl alcohols, gums, polyalkyleneglycols, white petroleum jelly or pounds, for example water, gelatine, lactose, starches, other known medicinal excipients. The pharmaceutical preparations may be, for example, tablets, dragees, or in liquid form solutions, suspensions or emulsions. They may be sterilised and/or contain assistants such as preserving, stabilising, wetting or emulsifying agents, salts for regulating the osmotic pressure, buffers and/or solution promotors. They may also contain further therapeutically useful substances. The preparations are formulated by known methods.

The following examples illustrate the invention.

EXAMPLE 1

A solution of 2.3 g. of sodium in 60 ml. of absolute ethanol is mixed with 15.9 g. of α,α,α-trichloro-β,β-bis-(para-hydroxyphenyl)-ethane. A solution of 13.6 g. of β-diethyl-aminoethyl chloride in 100 ml. of benzene is dropped in, the whole is refluxed for 5 hours, then cooled, the resulting suspension is dissolved in a small amount of water, the solution alkalinised with 2 N-sodium hydroxide solution and extracted with an excess of chloroform. The organic extract is washed with 3× 50 ml. of 2 N-sodium hydroxide solution and then twice with a saturated aqueous sodium chloride solution, dried over sodium sulphate and evaporated. The resulting α,α,α - trichloro-β,β-bis-[para-(β-diethylaminoethoxy)-phenyl]-ethane of the formula

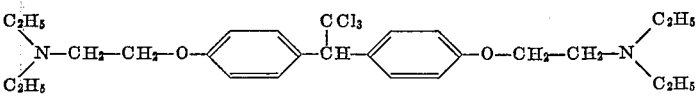

is converted in the known manner into its dihydrochloride which, after two recrystallizations from ethanol, melts at 168–170° C.

EXAMPLE 2

2.3 g. of sodium are dissolved in 100 ml. of absolute ethanol, and 15.8 g. of α,α,α,-trichloro-β,β-bis-(para-hydroxyphenyl)-ethane are added to the solution. At 10° C., 12.15 g. of γ-dimethylaminopropyl chloride, dissolved in 100 ml. of benzene, are added dropwise, the batch refluxed for 5 hours, then allowed to stand overnight. The reaction mixture is filtered off, and the filtrate evaporated. The residue is dissolved in water, rendered alkaline with 2 N-sodium hydroxide solution, and extracted with benzene. The benzene extracts are washed once with water, dried and evaporated. The dark oily residue is dissolved in 220 ml. of benzene and the solution passed through 100 g. of alumina (basic, activity II). The eluate is evaporated and the product so obtained converted in the usual manner into the dihydrochloride. Recrystallization from water+ethanol+acetone yields α,α,α - trichloro-β,β-bis-[para - (γ-dimethylaminopropoxy)-phenyl]-ethane dihydrochloride of the formula

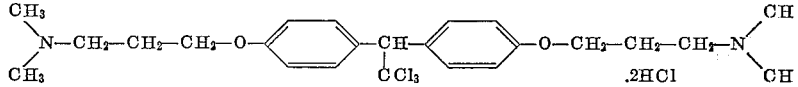

melting at 237–239° C. (with decomposition). The substance is hygroscopic.

EXAMPLE 3

15.9 g. of α,α,α-trichloro-β,β-bis-(para-hydroxyphenyl) - ethane are added to a solution of 5.53 g. of sodium in 200 ml. of absolute ethanol. The mixture is stirred for 30 minutes and, after the addition of 22.4 g. of β-morpholinoethyl chloride hydrochloride and 200 ml. of absolute benzene, stirred again for 30 minutes. The batch is then refluxed for 5 hours. The mixture is evaporated under vacuum, and the residue treated with 400 ml. of N-sodium hydroxide solution. The resulting solution is extracted with 3× 200 ml. of chloroform. The chloroformic extract is washed with 2× 200 ml. of water, dried over sodium sulfate, and evaporated. The resulting product is dissolved in 50 ml. of benzene and 40 ml. of petroleum ether, then chromatographed over 275 g. of alumina (basic, activity II). The first fraction, eluted with 100 ml. of a 1:1 mixture of benzene and petroleum ether, is discarded. The succeeding fractions, eluted with 700 ml. of a 1:1 mixture of benzene and petroleum ether, 550 ml. of a 1:3 mixture of petroleum ether and benzene, 900 ml. of benzene, and 300 ml of a 1:1 mixture of benzene and chloroform, are evaporated and combined. The residue is recrystallized several times from absolute ethanol to obtain α,α,α-trichloro-β,β-bis-[para-(β-morpholinoethoxy)-phenyl]-ethane of the formula

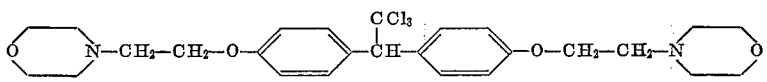

in the form of colorless crystals melting at 91–93° C. (with decomposition).

EXAMPLE 4

15.9 g. of α,α,α-trichloro-β,β-bis(-para-hydroxyphenyl)-ethane are added to a solution of 8.3 g. of sodium in 200 ml. of absolute ethanol. The mixture is stirred for 30 minutes and, after the addition of 28.26 g. of N-methyl-N' - (β - chlorethyl) - piperazine dihydrochloride stirred again for 30 minutes. The batch is then refluxed for 5 hours. The mixture is evaporated under vacuum, and the residue treated with 400 ml. of N-sodium hydroxide solution. The resulting solution is extracted with 3× 200 ml. of chloroform. The chloroformic extract is washed with 2× 200 ml. of water, dried over sodium sulfate, and evaporated. The resulting product is dissolved in 150 ml. of benzene and 100 ml. of petroleum ether, then chromatographed over 275 g. of alumina (basic, activity II). The first fraction, eluted with 200 ml. of a 1:1 mixture of 200 ml. of petroleum ether and benzene, is discarded. The succeeding fractions, eluted with 600 ml. of a 1:1 mixture of petroleum ether and benzene, 600 ml. of benzene, and 600 ml. of a 1:1 mixture of benzene and chloroform are evaporated and combined. The residue is dissolved in a small amount of absolute ethanol, acidified with 5.75 N-ethanolic hydrochloric acid, and crystallized. There is obtained in this manner $\alpha,\alpha,\alpha$-trichloro-$\beta,\beta$-bis-[para-($\beta$-N'-methylpiperazinoethoxy) - phenyl] - ethane tetrahydrochloride of the formula $$CH_3-N\frown N-CH_2-CH_2-O-\bigcirc-CH(CCl_3)-\bigcirc-O-CH_2-CH_2-N\frown N-CH_3 \cdot 4HCl$$

which after being recrystallized from methanol melts (with decomposition) at 172–174° C.

EXAMPLE 5

Tablets, each containing 500 mg. of $\alpha,\alpha,\alpha$-trichloro-$\beta,\beta$-bis-[para-($\beta$-diethylaminoethoxy)-phenyl]-ethane dihydrochloride can be made, for example, from the following ingredients:

| | Per tablet, mg. |
|---|---|
| $\alpha,\alpha,\alpha$ - trichloro - $\beta,\beta$ - bis - [para-($\beta$-diethylaminoethoxy)-phenyl]-ethane dihydrochloride | 500 |
| Wheat starch | 70 |
| Lactose | 27 |
| Colloidal silicic acid | 30 |
| Arrowroot | 40 |
| Talc | 30 |
| Magnesium stearate | 3 |
| | 700 |

Preparation

The $\alpha,\alpha,\alpha$ - trichloro-$\beta,\beta$-bis-[para-($\beta$ - diethylaminoethoxy)-phenyl]-ethane dihydrochloride is mixed with part of the wheat starch, the lactose, and the colloidal silicic acid, and the mixture passed through a sieve. The remainder of the wheat starch is pasted on the water bath with the five-old quantity of water, and the resulting paste kneaded with the powder mixture until a slightly plastic mass is obtained. The plastic mass is forced through a sieve with a mesh width of about 3 mm., dried, and the dry granulate passed through a sieve. The arrowroot, talc and magnesium stearate are then admixed, and the resulting mixture compressed into tablets weighing 700 mg. each.

What is claimed is:

1. A member selected from the group consisting of compounds of the formula $$\begin{array}{c}Hal'\\|\\Hal-C-Hal''\\|\\RO-Ph-CH-Ph'-OR'\end{array}$$

in which Hal, Hal' and Hal" each stands for halogen, Ph and Ph' each stands for a member selected from the group consisting of unsubstituted para-phenylene and para-phenylene substituted by one to four members selected from the group consisting of lower alkyl and lower alkoxy and R and R' each stands for a member selected from the group consisting of the groups of the formulae $$-alk-N\begin{array}{c}R_1\\ \\R_2\end{array} \quad and \quad -alk-N\frown X$$

alk representing lower alkylene having 2 to 5 carbon atoms, $R_1$ and $R_2$ each representing a member selected from the group consisting of lower alkyl and lower alkenyl having 1 to 5 carbon atoms, and $$-N\frown X$$

representing a member selected from the group consisting of lower alkyleneimino, morpholino, piperazino and N'-methyl-piperazino, and their acid addition salts.

2. A compound as claimed in claim 1 wherein Hal, Hal' and Hal" each stands for a member selected from the group consisting of fluorine, chlorine and bromine, Ph and Ph' each stands for unsubstituted para-phenylene and R and R' each stands for a member selected from the group consisting of the groups of the formulae $$-alk-N\begin{array}{c}R_1\\ \\R_2\end{array} \quad and \quad -alk-N\frown X$$

alk representing lower alkylene having 2 to 5 carbon atoms, $R_1$ and $R_2$ each representing a member selected from the group consisting of lower alkyl and lower alkenyl having 1 to 5 carbon atoms, and $$-N\frown X$$

representing a member selected from the group consisting of lower alkyleneimino, morpholino, piperazino and N'-methyl-piperazino.

3. A compound as claimed in claim 1, wherein Hal, Hal' and Hal" each stands for a member selected from the group consisting of chlorine and bromine, Ph and Ph' stand for unsubstituted para-phenylene, R and R' each stands for a member selected from the group consisting of the groups of the formulae $$-(CH_2)_n-N\begin{array}{c}R_1\\ \\R_2\end{array} \quad and \quad -(CH_2)_n-N\frown X$$

$R_1$ and $R_2$ standing for lower alkyl having 1 to 5 carbon atoms, $n$ for an integer from 2 to 3 and $$-N\frown X$$

for a member selected from the group consisting of pyrrolidino, piperidino, morpholino, piperazino and N'-methyl-piperazino.

4. A compound as claimed in claim 1, wherein Hal, Hal' and Hal" each stands for chlorine, Ph and Ph' each stands for unsubstituted para-phenylene and R and R' each stands for $\beta$-diethylaminoethyl.

5. A compound as claimed in claim 1, wherein Hal, Hal' and Hal" each stands for chlorine, Ph and Ph' each stands for unsubstituted para-phenylene and R and R' each stands for $\gamma$-dimethylaminopropyl.

6. A compound as claimed in claim 1, wherein Hal, Hal' and Hal" each stands for chlorine, Ph and Ph' each stands for unsubstituted para-phenylene and R and R' each stands for $\beta$-morpholinoethyl.

7. A compound as claimed in claim 1, wherein Hal, Hal' and Hal" each stands for chlorine, Ph and Ph' each stands for unsubstituted para-phenylene and R and R' each stands for $\beta$-(N'-methylpiperazino)ethyl.

8. A member selected from the group consisting of compounds of the formula $$\begin{array}{c}Hal'\\|\\Hal-C-Hal''\\|\\RO-Ph-CH-Ph'-OH\end{array}$$

in which Hal, Hal' and Hal" each stands for halogen, Ph and Ph' each stands for a member selected from the group consisting of unsubstituted para-phenylene and para-phenylene substituted by one to four members selected from the group consisting of lower alkyl and lower alkoxy and R stands for a member selected from the group consisting of [N-lower alkyl-pyrrolidinyl-lower alkyl, N-lower alkyl-piperidyl-lower alkyl and] the groups of the formulae $$-alk-N\begin{array}{c}R_1\\ \\R_2\end{array} \quad and \quad -alk-N\frown X$$

alk representing lower alkylene having 2 to 5 carbon atoms, $R_1$ and $R_2$ each representing a member selected from the group consisting of lower alkyl and lower alkenyl having 1 to 5 carbon atoms, and

representing a member selected from the group consisting of lower alkyleneimino, morpholino, piperazino and N'-methyl-piperazino, and their acid addition salts.

9. A compound as claimed in claim 8, wherein Hal, Hal' and Hal" each stands for a member selected from the group consisting of chlorine and bromine, Ph and Ph' stand for unsubstituted para-phenylene and R stands for a member selected from the group consisting of the groups of the formulae

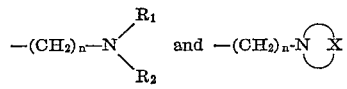

$R_1$ and $R_2$ standing for lower alkyl having 1 to 5 carbon atoms, $n$ for an integer from 2 to 3 and

for a member selected from the group consisting of pyrrolidino, piperidino, morpholino, piperazino and N'-methyl-piperazino.

References Cited

UNITED STATES PATENTS 3,247,199  4/1966  Marxer et al. _____ 260—246

ALEX MAZEL, Primary Examiner

JOSE TOVAR, Assistant Examiner

U.S. Cl X.R.

260—239, 243, 247.1, 247.2, 247.7, 268, 293.4, 294, 294.7, 326.3, 326.5, 570; 424—244, 246, 248, 256, 274